United States Patent

Patterson

[11] Patent Number: 5,995,332
[45] Date of Patent: Nov. 30, 1999

[54] SCISSORING LOAD RAMP FOR A REMOVABLE MEDIA DISK DRIVE

[75] Inventor: Robert S. Patterson, Poway, Calif.

[73] Assignee: Iomega Corporation, Roy, Utah

[21] Appl. No.: 08/920,594

[22] Filed: Aug. 29, 1997

[51] Int. Cl.[6] .................................................. G11B 5/54
[52] U.S. Cl. ............................................................ 360/105
[58] Field of Search ................................... 360/104–107; 369/77.1–77.2, 75.1–75.2

[56] References Cited

U.S. PATENT DOCUMENTS

| | | | |
|---|---|---|---|
| 4,051,735 | 10/1977 | Johnson et al. | 74/25 |
| 4,504,879 | 3/1985 | Toldi et al. | 360/105 |
| 4,644,429 | 2/1987 | Boe | 360/105 |
| 4,661,873 | 4/1987 | Schulze | 360/105 |
| 4,772,012 | 9/1988 | Toldi et al. | 360/97 |
| 4,787,000 | 11/1988 | Schulze | 360/105 |
| 4,811,143 | 3/1989 | Ohashi et al. | 360/105 |
| 4,933,785 | 6/1990 | Morehouse et al. | 360/78.04 |
| 5,023,737 | 6/1991 | Yaeger | 360/105 |
| 5,148,339 | 9/1992 | Yoshida | 360/105 |
| 5,204,793 | 4/1993 | Plonczak | 360/97.01 |
| 5,285,338 | 2/1994 | Sugahara et al. | 360/105 |
| 5,347,414 | 9/1994 | Kano | 360/105 |
| 5,691,860 | 11/1997 | Hoppe | 369/77.2 |
| 5,771,139 | 6/1998 | Lee et al. | 360/106 |

*Primary Examiner*—Allen T. Cao
*Attorney, Agent, or Firm*—Woodcock Washburn Kurtz Mackiewicz & Norris LLP

[57] ABSTRACT

An apparatus for loading and unloading heads from a removable cartridge disk drive. The apparatus comprises a scissoring load ramp that has a pair of pivoting arms. Each arm has a ramped end that pivots between and open and a closed position. In the open position, the ramped ends pivot away from each other and away from the surface of the media providing sufficient space for media to fluctuate during insertion and ejection from the drive. In the closed position, the ramped ends move toward each other and the media to provide a mechanism for loading and unloading the heads to and from the media.

20 Claims, 10 Drawing Sheets

SCISSORING LOAD RAMP FOR A REMOVABLE MEDIA DISK DRIVE

BACKGROUND OF THE INVENTION

This invention relates to cartridge based data storage systems. More particularly, the invention relates to head load ramps for a removable media disk drive.

Cartridge based tape and disk data storage devices for storing digital electronic information have been in use in the computer industry for several decades. Removable disk cartridges typically comprise an outer casing or shell that houses a disk-shaped magnetic, magneto-optical or optical storage medium upon which information can be stored. The cartridge shell often comprises upper and lower halves that are formed of injection molded plastic and are joined together to house the disk. Magnetic disk media can be either rigid or flexible and are mounted on a hub that rotates freely within the cartridge. When the cartridge is inserted into a disk drive, a spindle motor in the drive engages the disk hub in order to rotate the disk within the cartridge at a given speed. The outer shell of the cartridge typically has a media access opening proximate one edge to provide the recording heads of the drive with access to the disk. A shutter or door mechanism is provided to cover the head access opening when the cartridge is not in use to prevent dust or other contaminants from entering the cartridge and settling on the recording surface of the disk. The shutter is commonly biased to a closed position with a spring bias. To open the shutter and gain access to the media, the drive employs a mechanism that overcomes the bias of the spring.

Disk drives for use with such removable disk cartridges typically employ either a linear actuator mechanism or a radial arm actuator mechanism for positioning the read/write head(s) of the disk drive on the recording surface(s) of the storage medium, or disk. Because the disk cartridges are designed to be removable from the drive, the linear or radial arm actuators must be able to move off, and away from, the storage medium to a retracted position in order to prevent damage to the head(s) when a cartridge is inserted and removed from the disk drive. Moreover, many removable cartridge disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk. The opposing heads must be spread apart as they approach the edge of the disk during a head loading operation in order to avoid collision with the edge of the disk. Similarly, when the heads are unloaded from the disk, they must again be spread apart to avoid collision with the edge of the disk and each other.

Prior art removable media disk drive mechanism employed load ramps to safely unload the head from the media during cartridge insertion and ejection. Typically, such load ramps move over the edge of the media and capture the heads during cartridge ejection. After capturing the heads, the heads and the load ramp move in tandem away from the edge of the media. During cartridge insertion, these load ramps move back over the edge of the media in tandem with the heads after the media is fully mounted in the drive. Thereafter, the heads are permitted to unload onto the media surface. In this way, the load ramp protects the heads and the media from damage that could result if the heads collided with the edge of the media. However, where it is desirable to make a disk drive as small as possible, surface area of the drive becomes a premium commodity.

The existing load ramp designs pivot in the same plane as the media toward and away from its edge. This movement of the load ramp requires additional space on the drive chassis to accommodate the movement of the head ramps. Thus, a head load ramp that overcomes the drawbacks of the prior art is desirable. The current invention is directed to providing such a load ramp.

SUMMARY OF THE INVENTION

The present invention is directed to a data storage device that comprises a disk drive and removable cartridge. A load ramp for use in a removable media disk drive, having at least two opposing load beams, comprises a base with two arms pivotally attached to the base. Each arm has a ramped end. The arms pivot in opposing directions such that the arms pivot to an open position wherein the distance between the ramped ends is at a maximum and a closed position wherein the distance between the ramped ends is at a minimum. When the arms are in the open position, the distance between them allows media to enter between the arms to fluctuate without colliding with the arms. When the arms are in the closed position, load beam movement between the media and the load ramp is facilitated.

The load ramp further comprises a spring bias disposed between the arms such that the arms are biased toward a closed position. Means for overcoming said bias to move said arms to said open position comprises moving the load beams over the arms to overcome the bias of the spring.

The load ramp further comprises a head guard portion extending from the base in a plane substantially parallel to the surface of the media. The head guard has a ramped front surface to facilitate the movement of heads on and off of the media. The head guard operates to protect the heads from shock and vibration when parked.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides a removable media type of disk drive and a corresponding exemplary cartridge. Throughout the description, a preferred embodiment of the invention is described in connection with exemplary components. For example, a disk cartridge is shown with a particular shape and dimensions, and the drive is shown having a rotary actuator. However, the particular disk drive and cartridge shown are provided only to illustrate the operation of the present invention. Accordingly, the invention should not be limited to the particular cartridge or drive embodiment shown as the invention contemplates the application to other cartridge and drive types and configurations.

Figure 1:
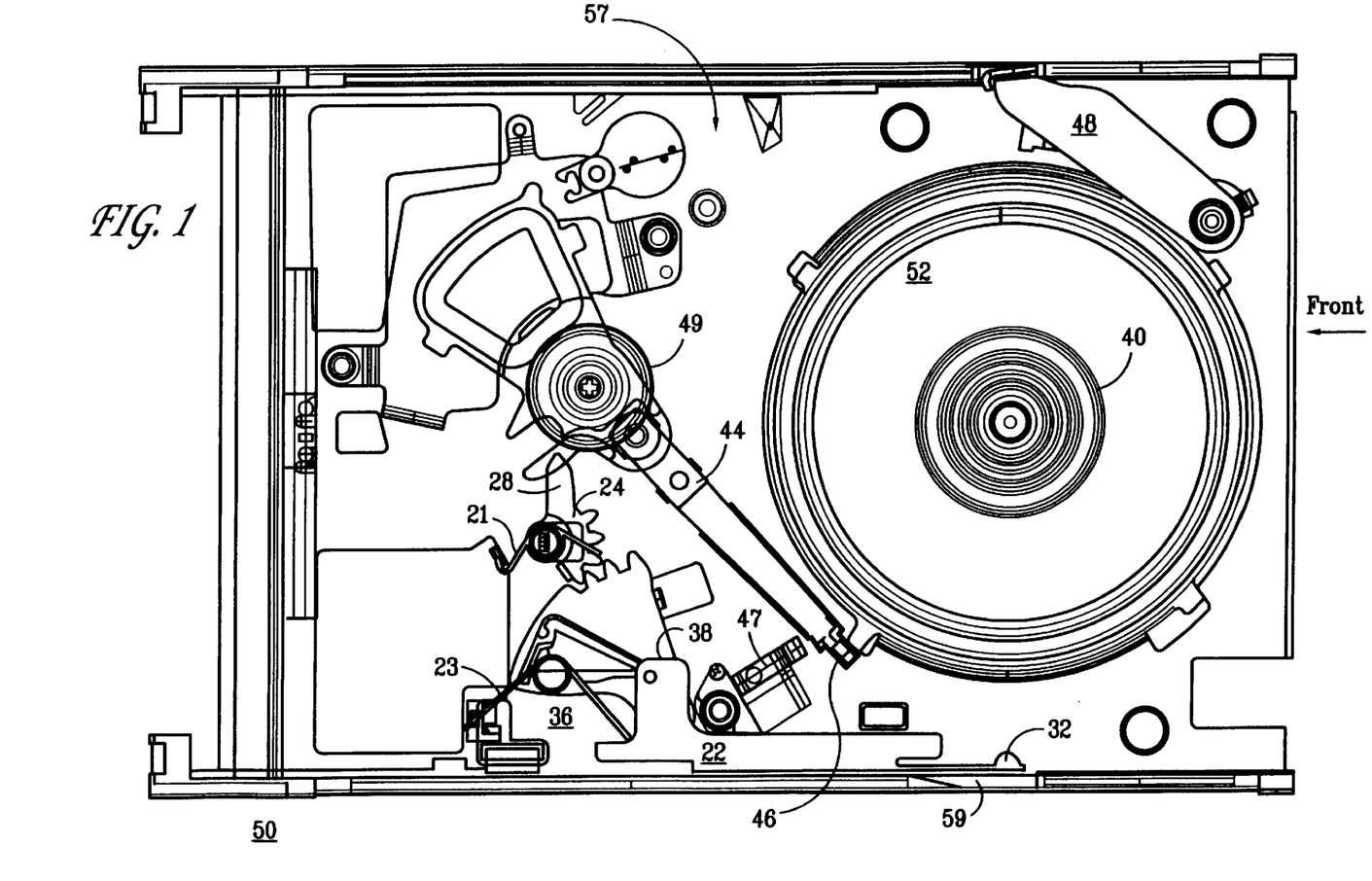
FIG. 1 is a top plan view of a disk drive according to the present invention.

FIG. 1 is a top view of a disk drive 50 with its top cover removed and the components moved from relative operational positions for clarity. Drive 50 comprises a chassis 57, an actuator 49 (preferably a rotary actuator), including an opposing pair of load beams 44 having a read/write head 46 disposed at the end of each load beam, a spindle motor 52 and a spindle 40, a load ramp 47, a shutter opening arm 48, and a load/eject mechanism which includes pinion 36, gear 24, sliding lever 22, and lever spring 23. A disk cartridge can be inserted into the front of the drive in the direction indicated by the arrow. During insertion, the cartridge slides linearly along the top surface of chassis 57 and spindle motor 52 for engagement with the read/write heads 46.

Figure 2A:
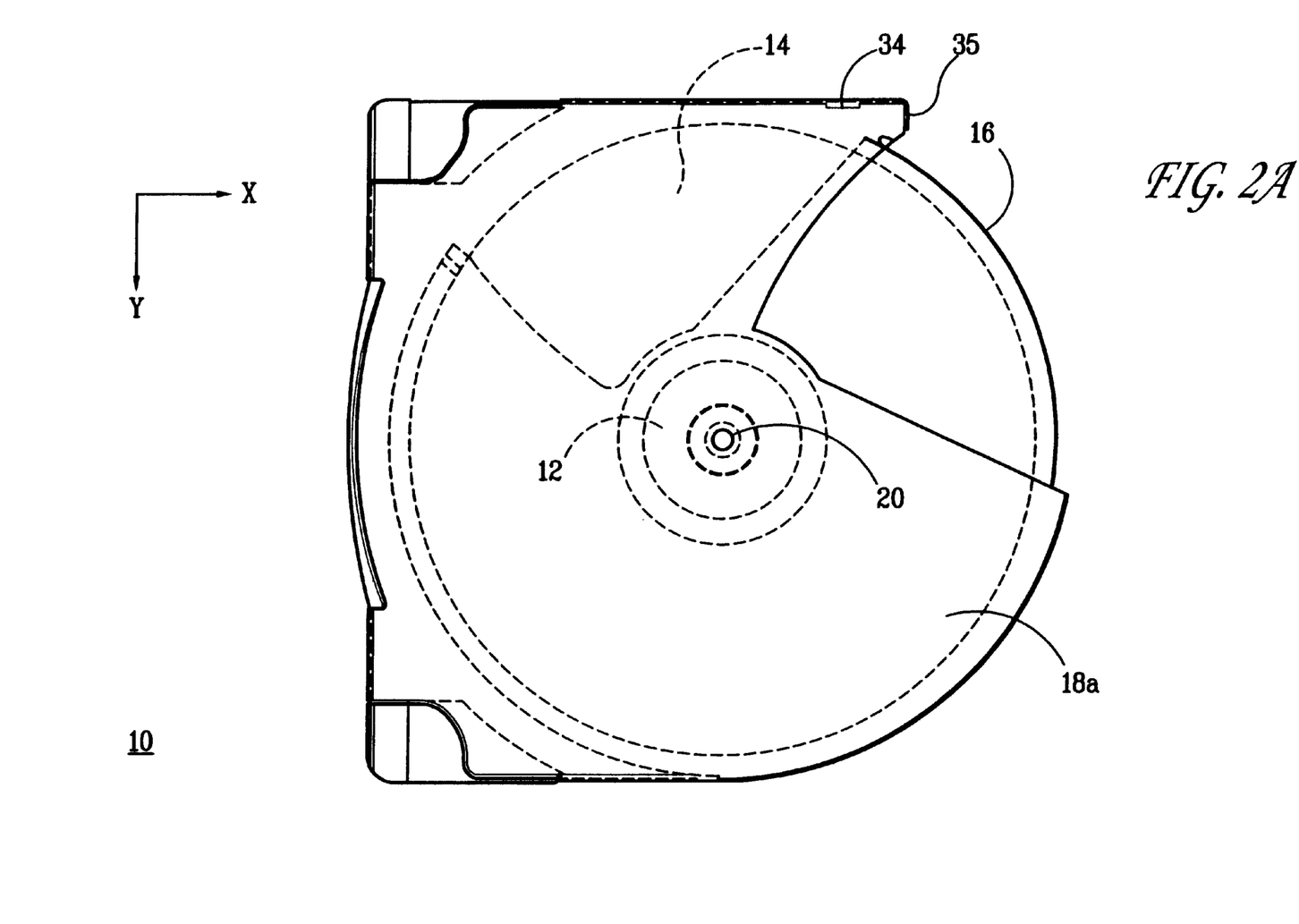
FIG. 2A is a top view of an exemplary cartridge for use with the present invention.
Figure 2B:
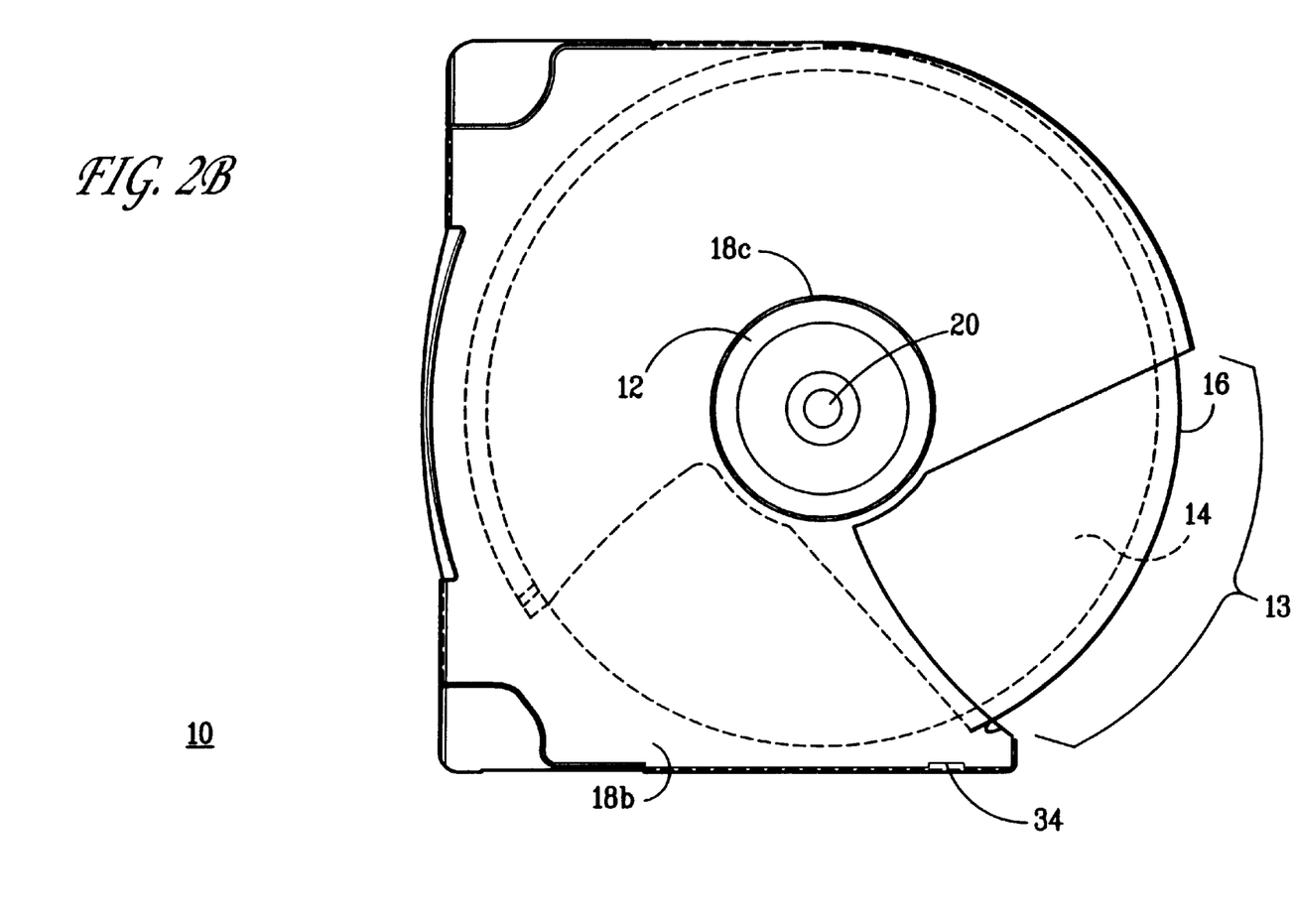
FIG. 2B is a bottom view of an exemplary cartridge for use with the present invention.

FIGS. 2A and 2B present top and bottom views of an exemplary disk cartridge 10 for use with the drive 50 of the present invention. Disk cartridge 10 comprises a flexible magnetic disk 14, a disk media hub 12, top and bottom cartridge shell halves 18a and 18b, a rotary shutter 16, and a shutter pivot pin 20. Shutter 16 rotates within cartridge 10 between an open position and a closed position. In the open position, shutter 16 is rotated away from a generally wedge shaped disk access opening 13 that is formed in cartridge shell 18, exposing the top and bottom surfaces of disk 14 for access by a read/write head or heads contained within the disk drive. In the closed position, shutter 16 is rotated over disk access opening 13, sealing disk cartridge 10 and protecting disk 14. Flexible magnetic disk 14 is formed of a thin polymer film, such as MYLAR, and has a thin magnetic layer uniformly dispersed on the top and bottom surfaces. The magnetic surfaces magnetically sensitize the flexible disk 14 and enable the storage of digital data when the surface is brought into magnetic communication with a magnetic transducer of the type commonly found in disk drives. Disk 14 is generally circular with a circular hole proximate the center of disk 14.

Media hub 12 is firmly secured to disk 14 such that the center of hub 12 is aligned proximate the center of disk 14. Media hub 12 is preferably attached to disk 14 via a well-known adhesive process. The disk and hub assembly are rotatably disposed between upper and lower cartridge shell halves 18a, 18b. Lower cartridge shell half 18b has a substantially circular spindle access opening 18c such that a disk drive can provide rotational power to disk 14 via hub 12.

Cartridge shell 18 also comprises a side cut-out 34 and abutment surface 35. As explained more fully below, cut-out 34 and abutment surface 35 engage sliding lever 22 during cartridge insertion and ejection. Cut-out 34 functions to retain the cartridge in drive 50 and ensure proper cartridge insertion while abutment surface 35 provides a flat surface for engagement and spring loading of sliding lever 22.

Figure 3A:
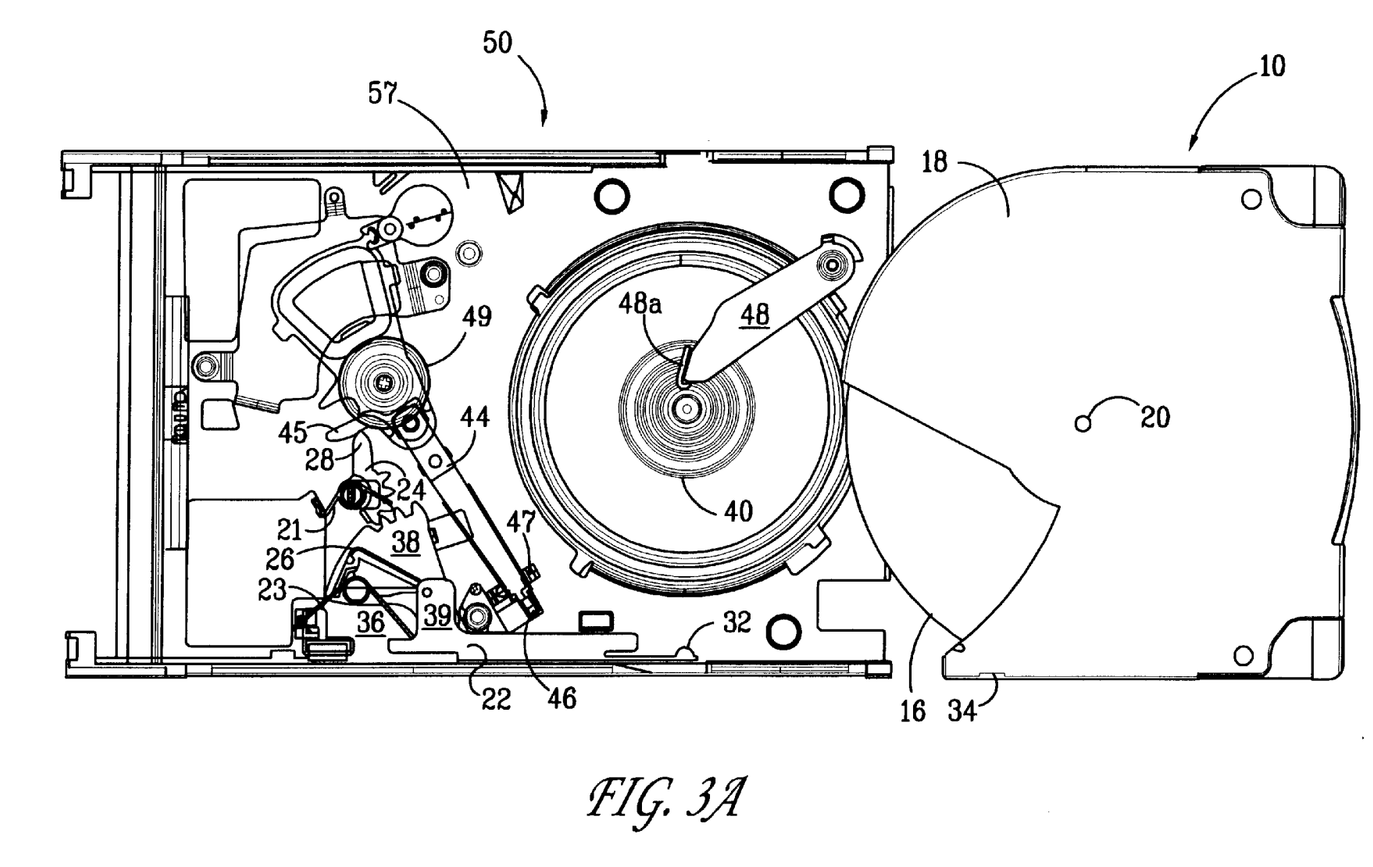
FIGS. 3A shows the cartridge of FIGS. 2 in an eject/pre-insertion position in relation to the drive of the present invention.
Figure 3B:
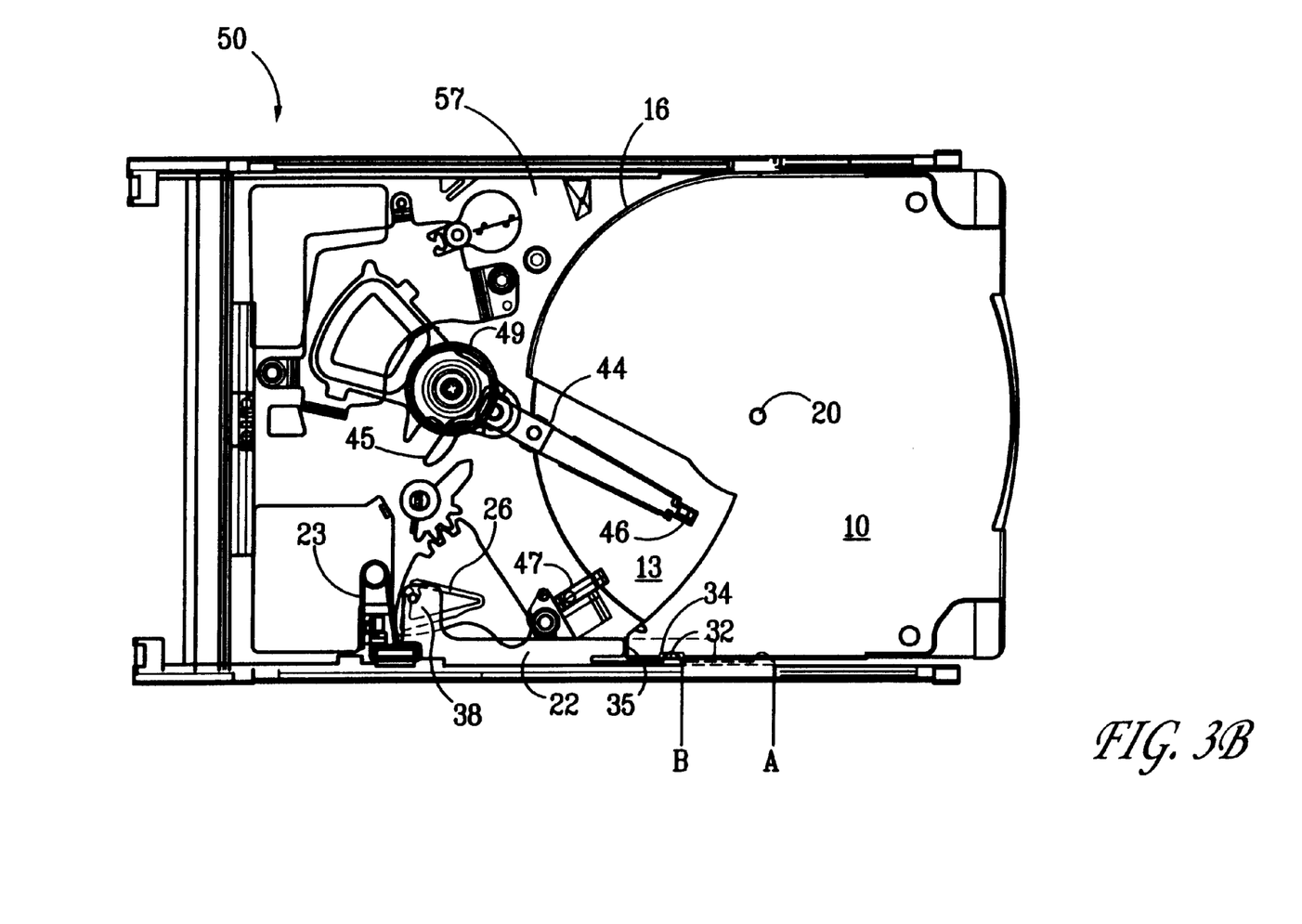
FIGS. 3B shows the cartridge of FIGS. 2 in a pre-eject/loaded position in relation to the drive of the present invention.

Referring now to FIGS. 3A and 3B, the operation of disk drive 50 in conjunction with a cartridge 10 is illustrated. FIG. 3A shows the drive mechanisms in the position that is assumed prior to insertion of a cartridge 10, which is the same position that is assumed after ejection of a disk cartridge. By contrast, FIG. 3B shows the position of the drive mechanisms when a cartridge is fully inserted and the drive is operational. Referring first to FIG. 3A, actuator 49 is retracted onto load ramp 47. Sliding lever 22 is released (i.e., biased forward). And, shutter operating arm 48 is ready to engage and rotate a shutter 16. Shutter operating arm 48 comprises a finger 48a adapted to engage shutter 16 and rotate it toward the open position during cartridge insertion. Spring tension is supplied to shutter 16 from within cartridge 10 to rotate shutter 16 back to the closed position during ejection of cartridge 10 from drive 50. Referring next to FIG. 3B, the cartridge is shown in the fully inserted position in drive 50. The actuator 49 is now allowed to move its read/write heads 46 across the surface of disk 14, read and writing information. Spring 23 is loaded to provided an ejection force to cartridge 10 during ejection of cartridge 10 from drive 50.

Sliding lever 23 comprises a flexible arm 23 with a protuberance 32 proximate the distal end. As cartridge 10 is inserted into drive 50, protuberance 32 engages the side of cartridge 10. The flexible arm 23 allows the protuberance to ride up onto and slide along the side wall of cartridge 10. An opening 59 in the sidewall of chassis 57 provides clearance for the flexible arm 23 to flex out of the way of cartridge 10. Eventually, protuberance 32 aligns with and enters cut-out 34 in cartridge 10 proximate the position indicated by line "A". As cartridge 10 is pushed further into drive 50, abutment surface 35 of cartridge 10 engages an end of sliding lever 22. Thereafter, cartridge 10 and sliding lever 22 slide in tandem into drive 50. As cartridge 10 is pushed still further into drive 50, sliding lever 22 slides from a position proximate the line "A" to a position proximate the line "B". At this point, flexible arm 23 no longer aligns with opening 59 in chassis 57. As a result, flexible arm 23 cannot flex out of engagement with cartridge 10, locking it into drive 50. Furthermore, the force on cartridge 10 and sliding lever 22 loads spring 23.

From a user's standpoint, cartridge 10 is loaded into operating position in drive 50 by pushing the cartridge 10 forward into drive 50 and then releasing the cartridge. Cartridge 10 is ejected from drive 50 by again pushing on the cartridge 10 and releasing. The load eject mechanism that provides this user interface comprises sliding lever 22, pinion 36, and gear 24. Pinion 36 comprises a triangular shaped race 26. In addition to the details provided above, sliding lever 22 comprises an ear 39 with a pin 38 projecting downwardly from ear 39 and into race 26 of pinion 36. Gear 24 comprises a spring 21 and latch 28. The teeth of gear 28 mesh with the teeth pinion 36, and latch 28 provides a mechanism to lock actuator 49 in a retracted position when a cartridge 10 is not in drive 50.

When cartridge 10 has been pushed far enough into drive 50 such that protuberance 32 engages cut-out 34 in cartridge 10, cartridge abutment surface 35 engages sliding lever 22, which is in a position proximate the line "A". Pin 38 of sliding lever 22 is in race 26 in the forward-most corner of the triangle. Now, as cartridge 10 is pushed further into drive 50, sliding lever 22 moves from a position proximate line "A" to a position proximate line "B", moving pin 38 along race 26 to the end of the first leg of the triangle formed by race 26. The movement of pin 26 along race 26 provides a force that causes pinion 36 to rotate counter-clockwise and spring 23 to load. In response to pinion 36 rotating counter-clockwise, gear 24 rotates clockwise against the bias of spring 21. As soon as cartridge 10 travels past its operating position, pin 38 engages the end of the first leg of race 26, preventing further forward travel and signaling the user that cartridge 10 has been pushed fully into drive 50. When the user subsequently releases cartridge 10, spring 23 causes pin 38 to travel further within race 26 until it comes to rest in the notch feature in race 26. Consequently, cartridge 10 is locked in the operating position. Latch 28, which rotates with gear 24, rotates away from lever 45 on actuator 49, freeing actuator 49 to move load beams 44 off of load ramp 47 and onto the surface of disk 14.

Disk ejection is reversed from the process described above. To start the ejection, a user once again push cartridge 10 forward into drive 50. The forward movement of cartridge 10 moves sliding lever 22 into drive 50. This forward movement of lever 22 moves pin 38 in race 26 out of the notch feature and to the end of the second leg of race 26. Simultaneously, pinion 36 is free to rotate clock-wise with the aid of spring loaded gear 24. At this point, forward movement of cartridge 10 is once again constrained, indicating to the user to stop pushing on cartridge 10. As the user stops pushing on cartridge 10 in response, spring 23 biases sliding lever 22 from a point proximate line "B" to a point proximate line "A", and moves pin 38 down the third leg of race 26 back to the forward-most corner. The spring force applied to sliding lever 22 also provides a force to eject cartridge 10 from drive 50. As spring 21 rotates gear 24 counter-clockwise, latch 28 moves actuator 49 to a parked position via lever 45. By parking actuator 49, load beams 44 and heads 46 are moved back onto load ramp 47.

Figure 4A:
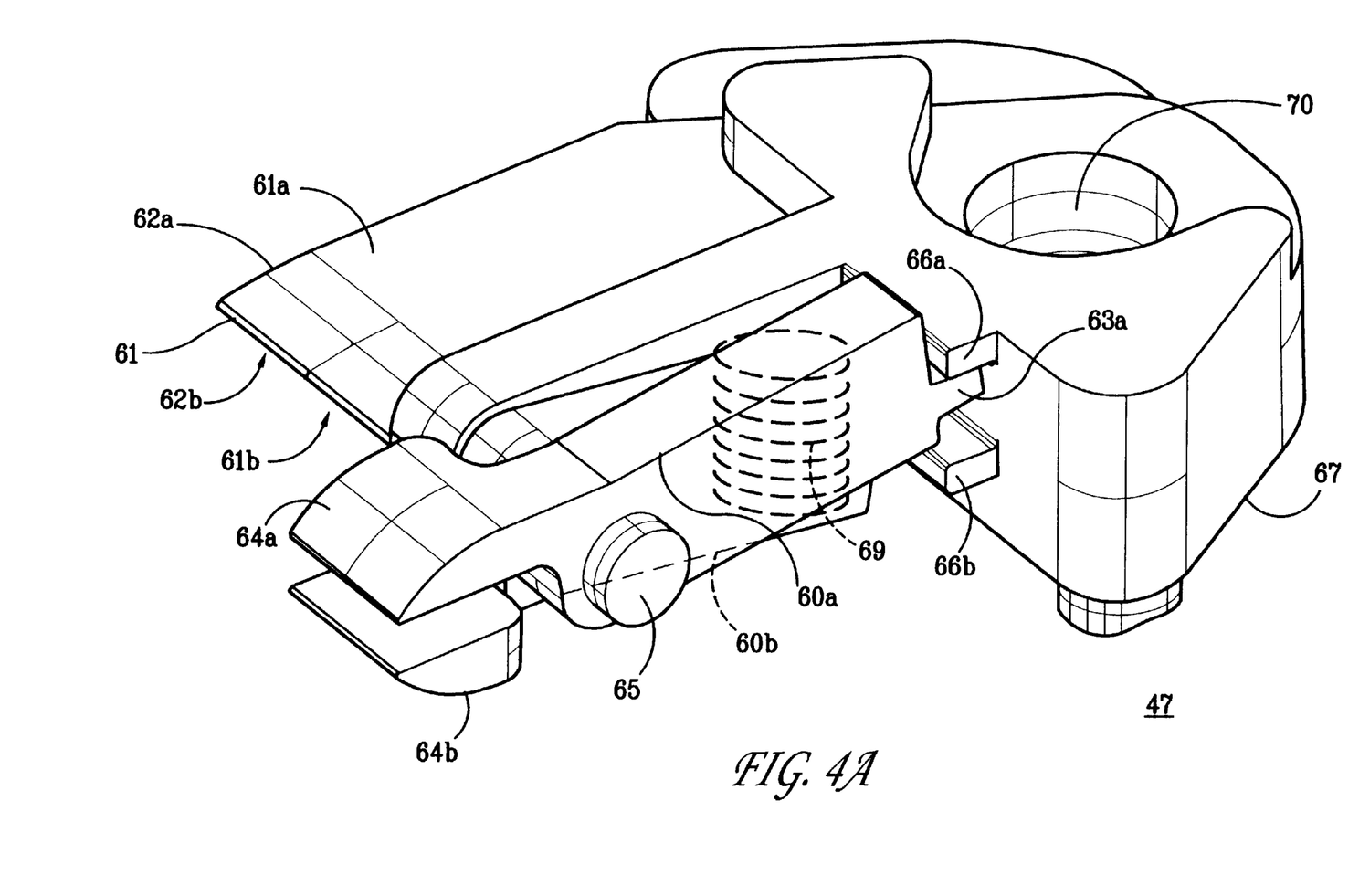
FIG. 4A shows an isometric view of the load ramp of the present invention.

FIG. 4A shows an isometric view of the load ramp in accordance with the present invention. Load ramp 47 comprises a base 67, head guard 61, pivoting arms 60*a* and 60*b*, abutments 66*a* and 66*b*, pivot pin 65, and compression spring 69. Each arms 60 comprises a ramped end portion 64 and a tail portion 63. Pivoting arms 60*a* and 60*b* are arranged to pivot about pivot pin 65 in opposing fashion between an open position, in which the ramped ends pivot away from each other, and a closed position in which the ramped ends pivot toward each other. Spring 69 is disposed between the arms 60*a* and 60*b* such that the arms 60*a* and 60*b* are biased toward the closed position. Tail portions 63*a* and 63*b* of arms 60*a* and 60*b*, respectively, engage the corresponding abutments 66*a* and 66*b* to restrain the rotational travel of arms 60*a* and 60*b* when they are biased toward the closed position. Base 67 also comprises a hole 70 for attachment to the drive chassis 57 by means of a screw or other common attachment means. Head guard 61 extends out from the base 67 and provides opposing surfaces 61*a* and 61*b*. Each surface 61*a* and 61*b* has a ramped front portion 62*a* and 62*b*, respectively. Each of these surfaces 61*a* and 61*b* provides a surface for heads 46 to rest when the actuator 49 is in the parked position.

Figure 4B:
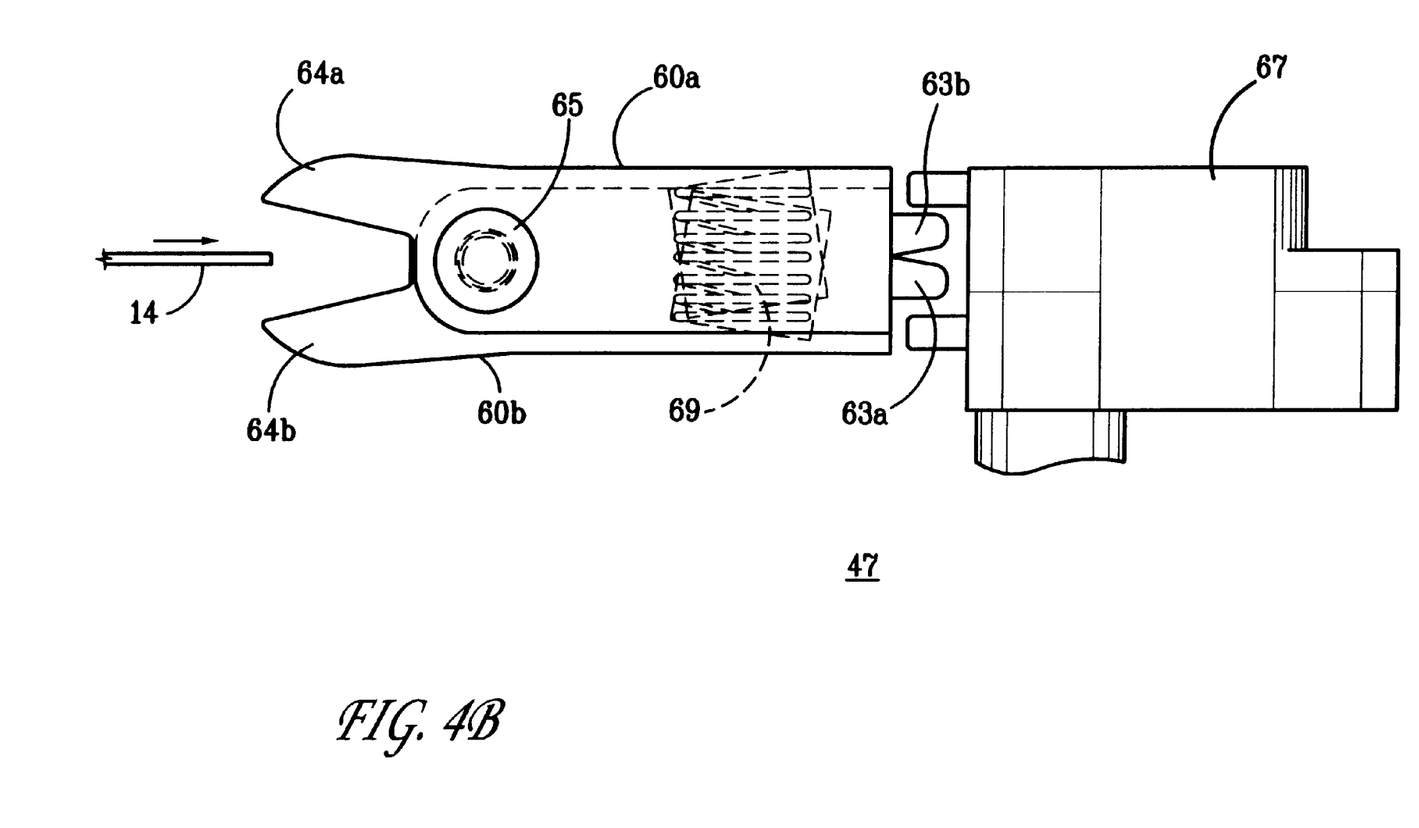
FIG. 4B shows the arms opened during media insertion to prevent damage to the media.
Figure 4C:
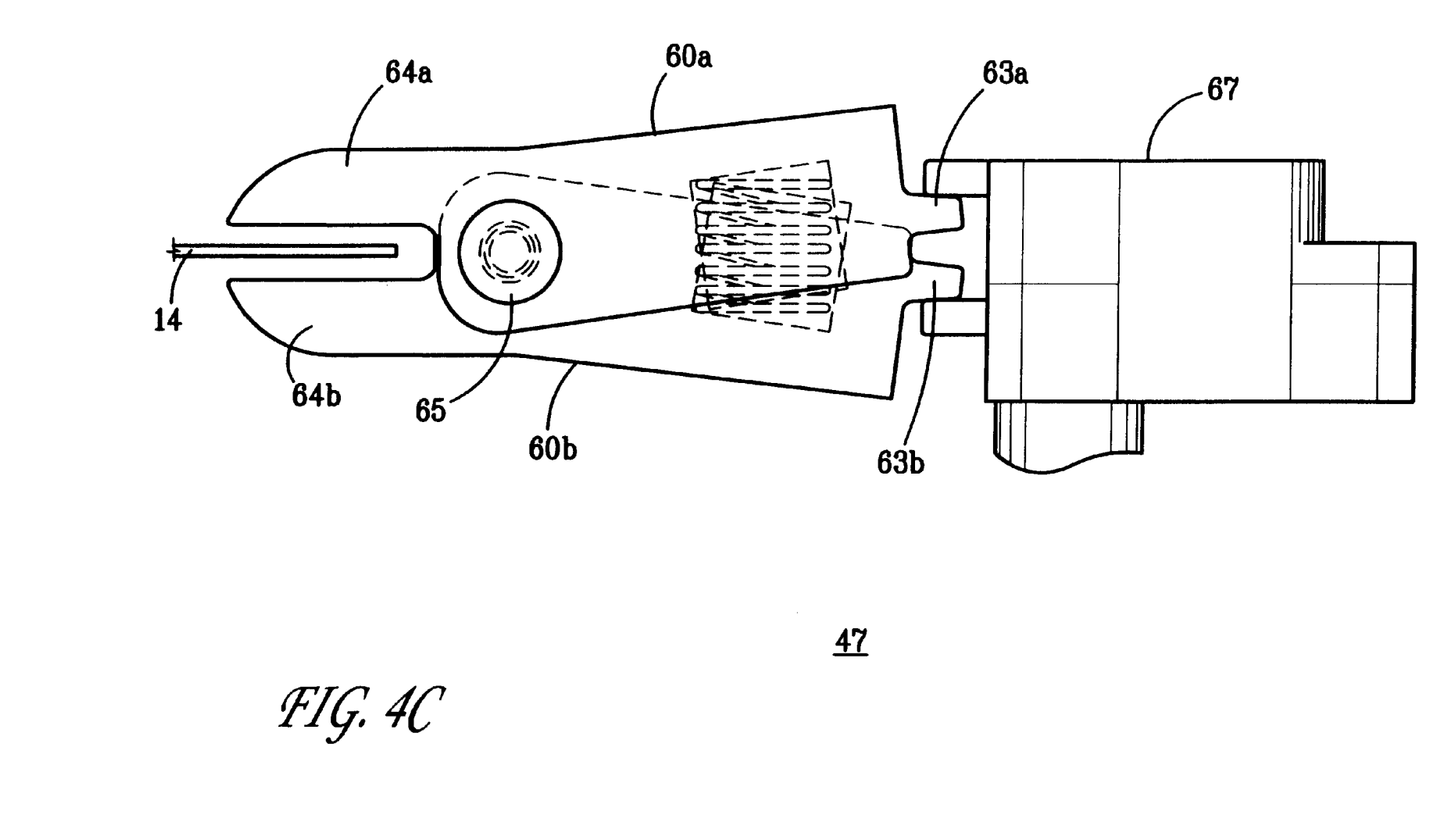
FIG. 4C shows the arms closed after media is fully inserted into the drive.

Referring now to FIG. 4B and 4C, side views of load ramp 47 are shown. In FIG. 4B, pivot arms 60*a* and 60*b* are in the open position, with spring 69 compressed (the means for compressing spring 69 is not shown in FIG. 4B but will be shown and described below with reference to FIG. 4D). Accordingly, the distance between ramped end portions 64*a* and 64*b* is maximized. With the distance thus maximized, media 14 entering between the end portions 64*a* and 64*b* has sufficient space to fluctuate during loading without a collision between media 14 and load ramp 47. In FIG. 4C, the pivot arms 60*a* and 60*b* are in the closed position. Once the media is fully inserted into drive 50, pivoting arms 60*a* and 60*b* can safely close over media 14 without damage to media 14. With arms 60*a* and 60*b* in the closed position, heads 46 can safely move between media 14 and load ramps 47.

Figure 4D:
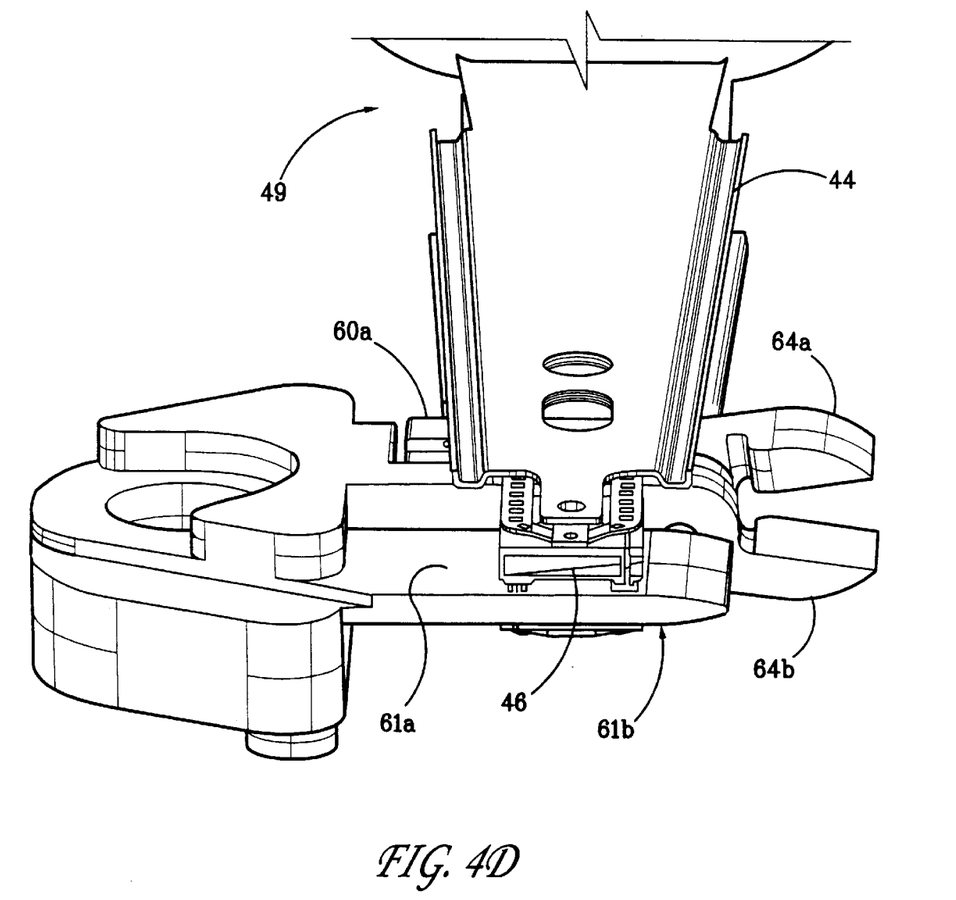
FIG. 4D shows the load ramp in relation to the actuator immediately before unloading or immediately after loading.

FIG. 4D shows an isometric view of actuator 49 in the parked position on load ramp 47. Thus parked, load arms 48 provide a clamping force on the arms 60*a* and 60*b* of load ramp 47. This clamping force compresses spring 69 and opens the ramped ends 64*a* and 64*b*. Drive 50 is now ready to accept a cartridge 10 and media 14 can fluctuate between ramped ends 64*a* and 64*b* as described above with reference to FIG. 4B. In the parked position, heads 46 rest on head guard surfaces 61*a* and 61*b*. These surfaces 61 restrict the movement of heads 46. As a result, opposing heads 46 cannot contact and cause damage in cases of shock or vibration. After cartridge 10 is inserted and media 14 is fully loaded, actuator 49 is free to move over media 14 read and writing data.

Figure 4E:
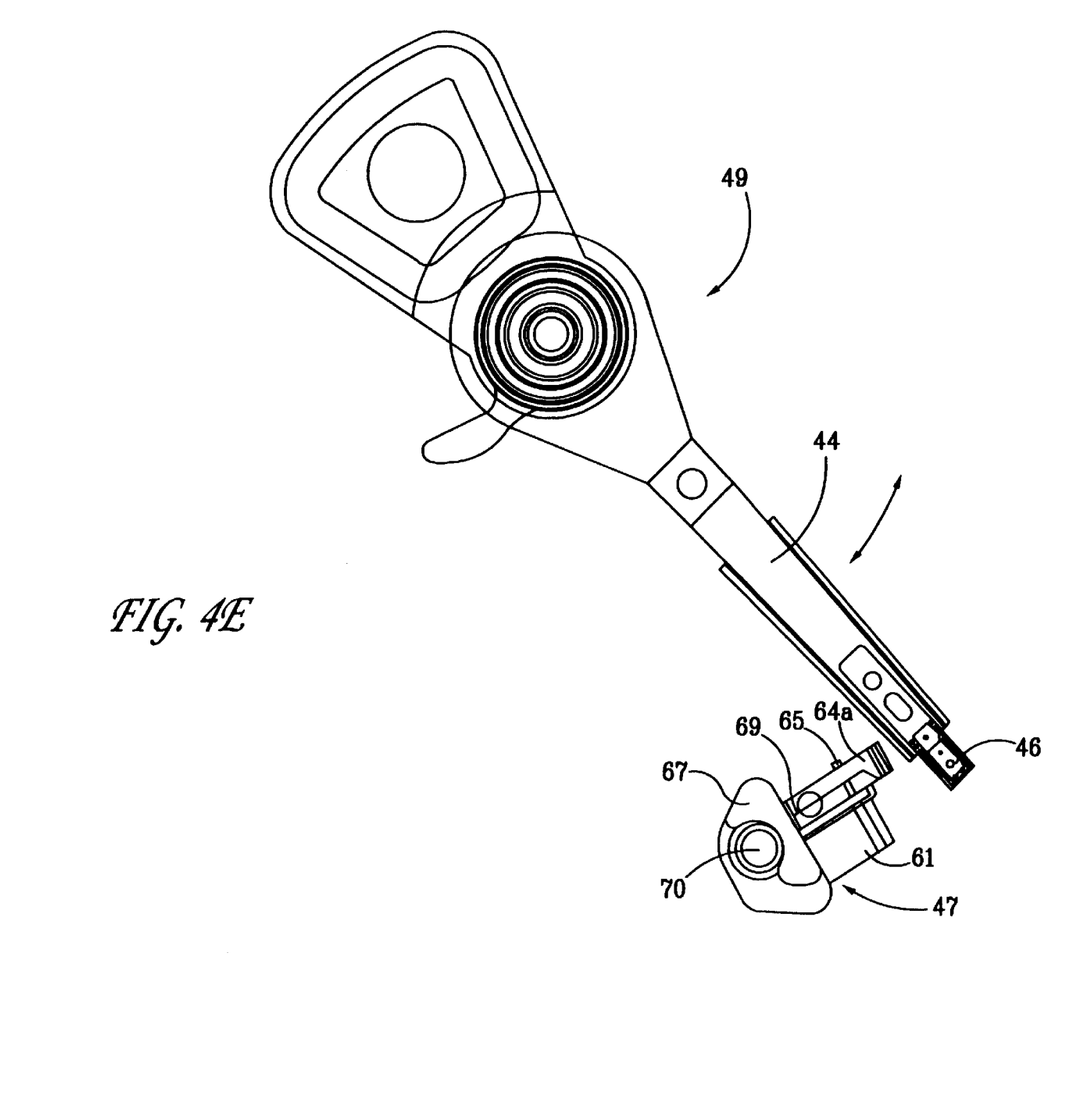
FIG. 4E shows the heads loaded onto the load ramp and compressing a bias spring.

Referring now also to FIG. 4E, the rotary actuator is shown after moving off of load ramp 47. As load beams 48 move from the parked position over pivot arms 60*a* and 60*b* toward the ramped ends 64*a* and 64*b*, the bias that load beams 48 place on spring 69 is relieved. As a result, the ramped ends 64*a* and 64*b* close toward the media providing a ramped surface for load beams 48 to slide down onto media 14. Eventually, actuator 49 moves the heads 46 via load beams 48 onto media 14. All the while, load ramp 47 does not pivot in the plane of the media but remains fixed. Load ramp 47 remain in the closed position until heads 46 are again parked.

The parking of heads 46 operates in the reverse of the above described head loading. In such an instance, heads 46 move toward load ramp 47. Eventually, load beams 48 engage and slide up the closed ramped ends 64*a* and 64*b*. When load beams 48 cross over the arms 60*a* and 60*b* proximate pivot pin 65, load beams 48 begin to compress spring 69. The compression of spring 69 and the movement of load beams 48 causes arms 60*a* and 60*b* to pivot toward the open position. With the ramped end portions 64*a* and 64 thus open, the media can once again fluctuate as it moves out of drive 50.

The above description of preferred embodiments is not intended to impliedly limit the scope of protection of the following claims. Thus, for example, except where they are expressly so limited, the following claims are not limited to applications involving removable media disk drive systems.

What is claimed is:

1. A load ramp for use in a disk drive of the type that accepts a removable cartridge containing a storage medium, said disk drive having at least one load beam, said load ramp comprising:

a base;

at least one arm pivotally attached to said base, said arm having a load beam engaging end, said arm pivoting between a first position, wherein the load beam engaging end of said at least one arm tilts toward the planar surface of the medium forming a ramp for allowing the at least one arm to slide up onto the load ramp, and a second position, wherein the load beam engaging end of said at least one arm tilts away from the surface of the medium allowing the medium to be accepted by said disk drive.

2. The load ramp as recited in claim 1 further comprising a spring coupled to said arm proximate a tail end of said arm such that said arm is biased toward a first position.

3. The load ramp as recited in claim 1 wherein said base is fixedly attached to said disk drive so as not to move in the same plane as the medium.

4. The load ramp as recited in claim 2 wherein said load beam compresses said spring when said load beam is unloaded from said medium.

5. The load ramp as recited in claim 1 further comprising a head guard portion extending from said base in a plane substantially parallel to said medium.

6. The load ramp as recited in claim 5 wherein said head guard comprises a ramped front surface.

7. The load ramp as recited in claim 1 wherein said base further comprises an abutment surface such that a tail end of said arm engages said abutment surface to constrain pivoting travel of said arm.

8. A load ramp for use in a disk drive of the type that accepts a removable cartridge that stores digital data on a magnetic medium, said disk drive having at least two opposing load beams, said load ramp comprising:

a base;

two arms pivotally attached to said base, each said arm having a a load beam engaging end, said arms pivoting in opposing directions, such that said arms pivot to a open position wherein the distance between the load beam engaging ends is at a maximum for allowing a medium to be accepted by said disk drive and a closed position wherein the distance between the load beam engaging ends is at a minimum for forming a ramp for disk drive load beams to move up the ramp and off of the surface of the medium.

9. The load ramp as recited in claim 8 further comprising a bias means disposed between said arms such that said arms are biased toward a closed position.

10. The load ramp as recited in claim 9 wherein said bias means comprises a spring.

11. The load ramp as recited in claim 9 or 10 further comprising opening means for overcoming said bias to move said arms to said open position.

12. The load ramp as recited in claim 11 wherein said opening means comprises said load beams such that said load beams pivot said arms to said open position against the bias of said spring.

13. The load ramp as recited in claim 8 further comprising a head guard portion extending from said base in a plane substantially parallel to said medium.

14. The load ramp as recited in claim 13 wherein said head guard comprises a ramped front surface.

15. A method of moving a read/write head on and off a load ramp and on and off a surface of a removable media, comprising the steps of:

a) pivoting an arm having a ramped front surface such that said ramped surface moves upwardly relative to a plane of said media;

b) inserting media past the front surface of said arm;

c) pivoting said arm such that said ramped surface moves downwardly toward the surface of said of said media; and, d) moving said head on and off of said load ramp by sliding a load beam attached to said heads over said arm and on and off of said media while said ramped surface is pivoted downwardly.

16. The method as recited in claim 15 wherein the step of pivoting said arm to said open position comprises the steps of biasing said arm toward said open position.

17. The method as recited in claim 16 wherein the step of pivoting said arm to said closed position comprises the steps of moving said load beam off of said media and onto said arm such that said bias is overcome.

18. A method of loading media into a disk drive wherein said drive comprises a pair of opposing load beams each having a read/write head disposed on a distal end thereof, said disk drive comprising a load ramp having two arms for maintaining said heads in a parked position off of said media, comprising the steps of:

a) pivoting said arms such that a front portion of each arm pivots away from each other and away from a plane of said media;

b) inserting media past the front surface of each said arm;

c) after said media is inserted into said drive, pivoting each arm such that said front surfaces move toward the surface of said of said media and toward each other.

19. The method as recited in claim 18 further comprising the step of moving said heads on and off of said load ramp by sliding said load beams on and off of said media while said front surfaces are pivoted toward the surface of said media.

20. The method as recited in claim 18 wherein the step of pivoting said arms to said open position comprises the steps of biasing said arm toward said open position by sliding said load beams onto said load ramp.

* * * * *

UNITED STATES PATENT AND TRADEMARK OFFICE
CERTIFICATE OF CORRECTION

PATENT NO. : 5,995,332
DATED : November 30, 1999
INVENTOR(S) : Robert S. Patterson It is certified that error appears in the above-identified patent and that said Letters Patent is hereby corrected as shown below:

Col. 4, line 63, "comer" should be -corner-.

Col. 5, line 29, "comer" should be -corner-.

Signed and Sealed this

Twenty-fifth Day of July, 2000

Attest:

Q. TODD DICKINSON

*Attesting Officer*     *Director of Patents and Trademarks*